United States Patent
Schlanger et al.

(10) Patent No.: US 10,579,391 B2
(45) Date of Patent: Mar. 3, 2020

(54) SYSTEM ON A CHIP HARDWARE BLOCK FOR TRANSLATING COMMANDS FROM PROCESSOR TO READ BOOT CODE FROM OFF-CHIP NON-VOLATILE MEMORY DEVICE

(71) Applicant: Oracle International Corporation, Redwood City, CA (US)

(72) Inventors: Erik Schlanger, Austin, TX (US); Eric Devolder, Cedar Park, TX (US); Ashraf Ahmed, Austin, TX (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 718 days.

(21) Appl. No.: 13/955,242

(22) Filed: Jul. 31, 2013

(65) Prior Publication Data

US 2015/0039874 A1 Feb. 5, 2015

(51) Int. Cl.
*G06F 9/4401* (2018.01)

(52) U.S. Cl.
CPC .................. *G06F 9/4401* (2013.01)

(58) Field of Classification Search
CPC ............................ G06F 9/4401; G06F 9/4411
See application file for complete search history.

(56) References Cited

U.S. PATENT DOCUMENTS

| | | | |
|---|---|---|---|
| 6,247,084 B1 * | 6/2001 | Apostol, Jr. | ........ G06F 13/1684 710/100 |
| 6,816,750 B1 | 11/2004 | Klaas | |
| 6,912,638 B2 | 6/2005 | Hellman et al. | |
| 7,246,245 B2 | 7/2007 | Twomey | |
| 7,397,274 B1 * | 7/2008 | Tang | .............. G01R 31/318516 326/16 |
| 7,822,958 B1 * | 10/2010 | Allen | .................... G06F 9/4401 326/41 |
| 8,555,082 B1 * | 10/2013 | Bibikar | .................... G09C 1/00 713/189 |
| 9,411,688 B1 * | 8/2016 | Poolla | .............. H03K 19/17764 |
| 2002/0046399 A1 * | 4/2002 | Debling | .............. G06F 11/3636 717/138 |
| 2003/0061529 A1 * | 3/2003 | Iwasa | ........................ G06F 1/08 713/600 |
| 2004/0236997 A1 * | 11/2004 | Poo | ........................ G06F 9/4406 714/36 |

(Continued)

OTHER PUBLICATIONS http://web.archive.org/web/20071119155603/https://en.wikipedia.org/wiki/Memory_Controller, "Memory Controller", 3 pages, Sep. 20, 2007.*

(Continued)

*Primary Examiner* — Phil K Nguyen
(74) *Attorney, Agent, or Firm* — Snell & Wilmer L.L.P.; Kent A. Lembke; Jonathon A. Szumny

(57) ABSTRACT

Translation of boot code read request commands from an on-board processor of a system on a chip (SoC) from a bus protocol (e.g., advanced high-performance bus (AHB) protocol) into a sequence of commands understandable by a serial interface of the SoC to read boot code from an off-board (e.g., flash or other non-volatile) memory device. The serial interface of the memory device may include a relatively low pin count (e.g., 5 pins) and boot code of the memory device may be modified after tape-out of the SoC free of necessitating a subsequent tape-out of the SoC.

14 Claims, 2 Drawing Sheets

(56) References Cited

U.S. PATENT DOCUMENTS

| | | | |
|---|---|---|---|
| 2005/0005076 A1* | 1/2005 | Lasser | G06F 8/60 711/154 |
| 2005/0120163 A1* | 6/2005 | Chou | G11C 16/10 711/103 |
| 2005/0283598 A1* | 12/2005 | Gaskins | G06F 9/4403 713/2 |
| 2006/0174100 A1* | 8/2006 | Park | G06F 9/4406 713/2 |
| 2006/0195650 A1* | 8/2006 | Su | G11C 16/20 711/103 |
| 2010/0095044 A1* | 4/2010 | Cho | G06F 9/4406 710/308 |
| 2011/0246708 A1* | 10/2011 | Li | G06F 13/4243 711/103 |

\* cited by examiner

SYSTEM ON A CHIP HARDWARE BLOCK FOR TRANSLATING COMMANDS FROM PROCESSOR TO READ BOOT CODE FROM OFF-CHIP NON-VOLATILE MEMORY DEVICE

BACKGROUND

1. Field of the Invention

The present invention relates in general to integrated circuits and, in particular, to a system on a chip (SoC).

2. Relevant Background

An SoC is an integrated circuit (IC) that integrates components of a computer or other electronic system into a single chip. For instance, it may contain digital, analog, mixed-signal, and often radio-frequency functions all on a single chip substrate. Sophisticated design and fabrication techniques are rapidly making practical SoCs a reality. In turn, a broad range of personal and commercial hand-held appliances can be constructed which embody a high degree of functionality. These appliances include smartphones, tablet computers, personal digital assistants, personal digital music players, compact computers, point of sale devices, and Internet access devices, to name only a few of the possibilities.

Generally, a number of factors are addressed when designing an SoC. Among other things, the SoC should be capable of interfacing with a broad range of input/output devices which may be required to support various potential user-defined applications. Moreover, the SoC should be power efficient while operating at high clock speeds. Furthermore, the SoC should have a large address space to flexibly support a range of possible memory configurations and sizes.

SUMMARY

A boot sector or boot block generally connotes a region of a hard disk, floppy disk, optical disc, or other data storage device that contains machine code (e.g., "boot code" or "boot block code") to be loaded into memory (e.g., random-access memory (RAM)) of the SoC upon reset or powering-on of the SoC. For instance, a processor of the SoC may send a read request for the boot block code corresponding to some particular address and eventually obtains the boot code which it executes as part of the boot process (e.g., booting or booting up of the SoC). The boot process is the initial set of operations that the SoC performs upon a reset or power-on of the SoC and may include, for instance, performing a power-on self-test, locating and initializing peripheral devices, and/or the like. In one arrangement, part of the boot process may be finding and loading one or more programs (e.g., an operating system) into system memory (e.g., RAM) for execution.

In the case of an SoC, the boot block code is often stored in on-chip (e.g., on-board) read-only memory (ROM). However, any changes to the boot block code after a "tape out" of the SoC (i.e., after the design phase of the SoC has been completed) would necessitate one or more subsequent tape outs of the SoC (e.g., each being a time-consuming process). In this regard, the boot code is typically subject to a verification process that is also a time-consuming effort requiring many hundreds of man hours from engineers and the like. In some situations, the boot code is stored in an off-chip (e.g., off-board) flash memory device via a specified flash interface of the SoC (e.g., having a large pin count of 32 pins or the like) which advantageously allows the code to be changed post-tape without the cost of a mask set and/or subsequent tape outs. However, use of such a flash interface to allow for reading of boot code from an interconnected flash device results in more complex chip packaging, increased board costs, and overall higher manufacturing and design costs.

In this regard, disclosed herein are methods, apparatuses, modules and the like (e.g., "utilities") that allow an on-board processing unit of an SoC to read and/or obtain boot code from an off-chip non-volatile memory device (e.g., flash memory device, Secure Digital (SD) card, etc.) to allow for post-tape out boot code changes while maintaining a minimized or reduced pin count for communications (e.g., signals) between the off-chip non-volatile memory and the SoC. More specifically, an off-board non-volatile memory device storing the boot code for an SoC (thus functioning as a boot block) may be electrically interconnected to a low pin-count serial interface of the SoC (e.g., an interface that serially transfers bits of information) such as a Serial Peripheral Interface (SPI) interface, Inter-Integrated Circuit ($I^2C$) interface, and/or the like. For purposes of this disclosure, a "low pin-count" may be not more than about 10 signal pins, such as not more than about 8 signal pins, or even more particularly not more than about 5 signal pins.

An on-board translation unit (e.g., a hardware block on the SoC) may receive (e.g., intercept) boot code read request commands from an on-board processing unit (e.g., one or more processing cores) over one or more buses of the SoC (e.g., advanced high-performance bus (AHB), advanced peripheral bus (APB), advanced system bus (ASB), other instruction/data buses, and/or the like), facilitate translation of the commands from one or more bus protocols into a sequence of commands (e.g., a sequence of read and write requests) needed by the serial interface to obtain the boot code from the off-chip non-volatile memory, and then send the command sequence to the serial interface over one or more buses. For instance, upon receipt of the command sequence from the on-board translation unit, the serial interface may proceed to perform a plurality of reads and writes of the non-volatile memory (e.g., as part of a "handshake" process) to serially obtain portions (e.g., words, instructions) of the boot code.

The on-board translation unit may then receive (e.g., read) the boot code portions from the serial interface, filter out of any unrelated information (e.g., data or code unrelated to the boot process), and then send the boot code (e.g., at least one portion or instruction of the boot code) in any appropriate manner to the processing unit for execution. In one arrangement, the first instruction of the boot code received by the processing unit may be the first instruction fetch performed by the processing unit upon start-up or reset of the SoC. Advantageously, the processing unit need not access system ROM for accessing the boot code to boot up the SoC, post tape-out changes to the boot code may be implemented free of necessitating subsequent tape-outs, total signal pins interconnecting the non-volatile memory storing the boot code and the SoC may be reduced, and the like.

In one aspect, a method for use with an SoC includes receiving, at a hardware block of the SoC, at least one command to read information stored in an off-board memory device; translating the at least one command from a bus protocol into a command sequence usable by a serial interface of the SoC to read the information from the off-board memory device; and sending the command sequence to the serial interface.

In one arrangement, a handshake operation may be performed by the serial interface to obtain a plurality of portions of the information from the off-board memory device at the serial interface. For instance, the performing step may include carrying out a plurality of write and read requests of the off-board memory device to obtain the plurality of information portions. The method may then include reading (e.g., by the hardware block) the information from the serial interface, and returning the information to the processing unit.

In another aspect, a method of booting an SoC includes generating, by a processing unit of the SoC, a command to read boot code for use in booting the SoC; translating, by a hardware block of the SoC, the read command into a command sequence usable by a serial interface of the SoC to obtain the boot code from an off-chip non-volatile memory device; sending, from the hardware block, the command sequence to the serial interface; and carrying out, by the serial interface, the command sequence to obtain the boot code from the off-chip non-volatile memory device.

In a further aspect, an SoC includes a chip; a plurality of buses disposed on the chip; a processing unit electrically interconnected to a first of the buses; a serial interface electrically interconnected to a second of the buses; and a hardware block electrically interconnected between the first and second buses, wherein the hardware block comprises a translation unit that translates commands received from the processing unit, via the first bus, to read boot block code from an off-chip non-volatile memory device via the serial interface, over the second bus, into a corresponding command sequence understood by the serial interface.

In addition to the exemplary aspects and embodiments described above, further aspects and embodiments will become apparent by reference to the drawings and by study of the following descriptions.

DETAILED DESCRIPTION

The present disclosure is generally directed to utilities configured to allow for post SoC tape out changes to boot block code of the SoC free of necessitating subsequent tape-outs, to minimize or at least reduce signal pin counts of interfaced off-board non-volatile memory devices on which the boot block code is stored, to reduce chip packaging complexity and cost, and the like. Specifically, an SoC can be configured with a hardware block that translates boot code read request commands from an on-board processor of the SoC from a bus protocol (e.g., advanced high-performance bus (AHB) protocol) into a sequence of commands recognizable by a serial interface of the SoC to read boot code from an off-board (e.g., flash or other non-volatile) memory device. After the serial interface has implemented the command sequence (e.g., via performing a plurality of write and read operations) to obtain the boot code from the off-board non-volatile memory device, the boot code may be received at the hardware block which may perform any necessary filtering or cleaning of the code before passing the code (e.g., one portion at a time, one instruction at a time, etc.) to the processing unit. The serial interface of the SoC and the off-board non-volatile memory device may each include a relatively low pin count (e.g., 5 pins), and boot code of the off-board memory device may be modified after tape-out of the SoC free of necessitating a subsequent tape-out of the SoC.

Figure 1:
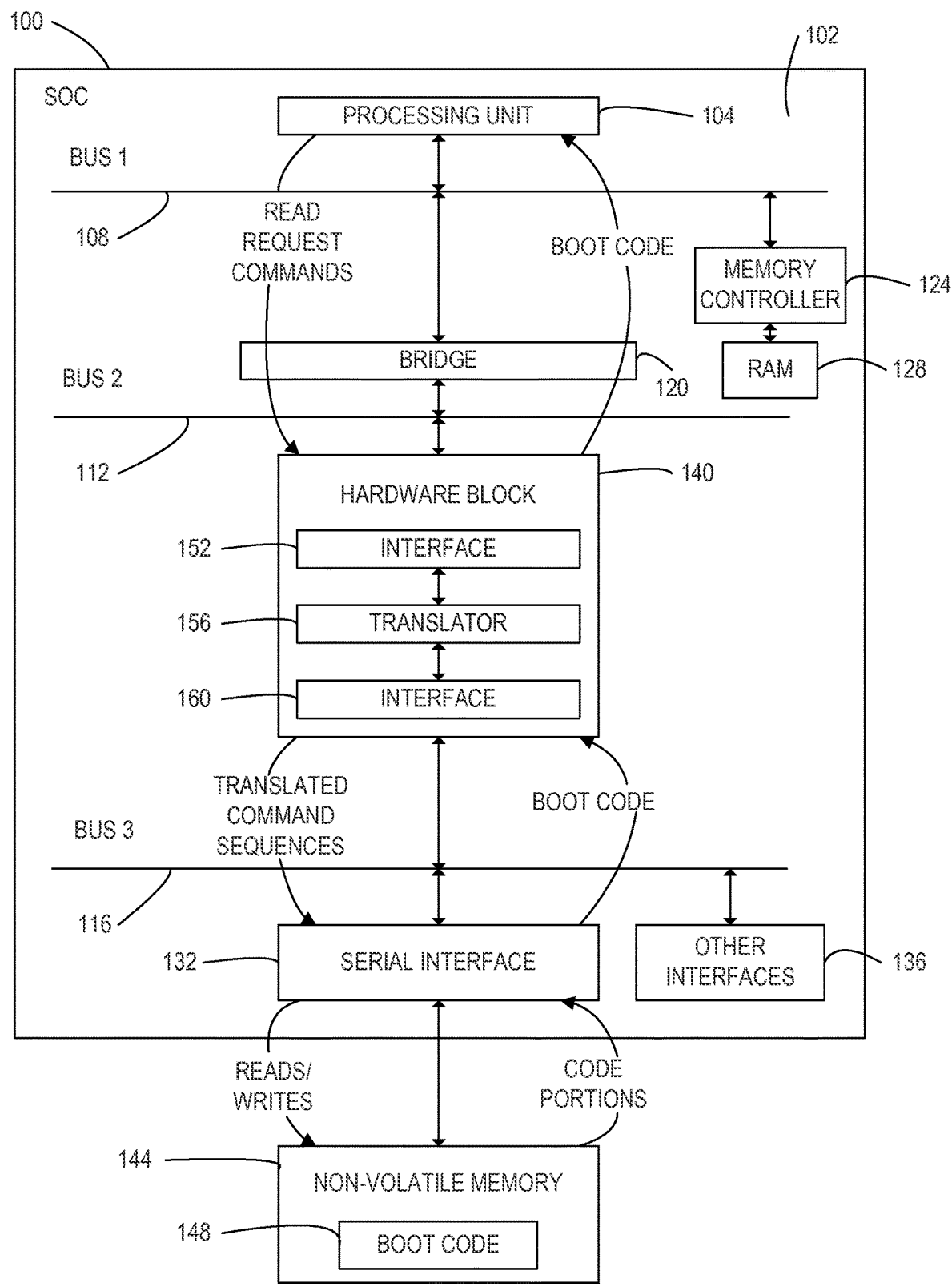
FIG. 1 is a system diagram of an SoC configured to read boot code from an off-chip non-volatile memory device via a serial interface of the SoC according to one embodiment.

A simplified block diagram of an SoC 100 that is configured to implement the various inventive functionalities disclosed herein is presented in FIG. 1. Broadly, the SoC 100 may be a general purpose processing device suitable for use in a number of high performance personal and commercial information processing systems requiring small device size, low power consumption, and/or the like. For instance, the SoC 100 may be embodied in personal portable appliances (e.g., smartphones, tablets, etc.), portable Internet appliances and personal digital assistants, commercial portable appliances such as portable point-of-sale terminals, intelligent peripherals, telecommunications appliances, compact computers, and the like. The SoC 100 may be in the form of a chip 102 (e.g., an (IC)) including a set of components and electronic circuits on a semiconducting chip (e.g., made of silicon).

As shown in FIG. 1, a processing unit 104 is disposed on the chip 102 that operates in conjunction with a plurality of off-chip and/or on-chip peripherals and other components via a plurality of buses such as first, second and third buses 108, 112, 116 (e.g., Advanced Extensible Interface (AXI), AHB, APB, etc.). The processing unit 104 may represent one or more microcontrollers, microprocessors, processor cores, digital signal processing cores, and/or the like, where each microprocessor or processing core is configured to appropriately perform a series of instruction cycles by retrieving instructions (e.g., code) from any appropriate memory, determining what actions the instructions require, carrying out the actions, and/or the like. For instance, the processing unit 104 may be appropriately electrically connected to the first bus 108 (e.g., AXI or the like), where the first bus 108 is electrically interconnected to the second bus 112 (e.g., AHB or the like) via any appropriate bridge 120 (e.g., fabric) for communication therebetween. A memory controller 124 may be electrically connected to the second bus 112 and configured to interface with one or more memory devices (e.g., off-chip RAM 128) for transfer of information (e.g., data, code, etc.) between the memory devices and componentry of the SoC 100 (e.g., processing unit 104).

Each of a plurality of interfaces such as a serial interface 132 (e.g., SPI) and one or more other interfaces 136 (e.g., general purpose input/output (GPIO), universal asynchronous receiver/transmitter (UART), system bus interface, etc.) may be electrically connected to the third bus 116 (e.g., APB or the like) and configured to respectively electrically interconnect a plurality of peripherals or the like to the SoC 100. While not shown, a number of additional interfaces may also be electrically connected to one or both of the first and second buses 108, 112, a bridge may electrically interconnect the second and third buses 112, 126, and the like. In one arrangement, separate processing cores may be respectively electrically connected to different buses (e.g., the first and second buses 108, 112). In this regard, it is to be understood that the SoC 100 illustrated in FIG. 1 has been simplified in the interest of clarity and that numerous other arrangements and configurations of the SoC 100 consistent with the teachings presented herein are encompassed within the scope of the present disclosure.

As discussed previously, the boot code used by the processing units (e.g., processors, cores, etc.) of many SoCs is often located in on-chip ROM which necessitates additional time-consuming SoC tape-outs in response to any changes to the boot code after the initial tape-out. While the boot code is sometimes stored in an off-chip flash memory device which allows the code to be changed post-"tape out" free of necessitating additional tape-outs, the off-chip flash memory device is electrically connected to a specified flash interface of the SoC which has a large signal pin count of 32 pins or the like.

Figure 2:
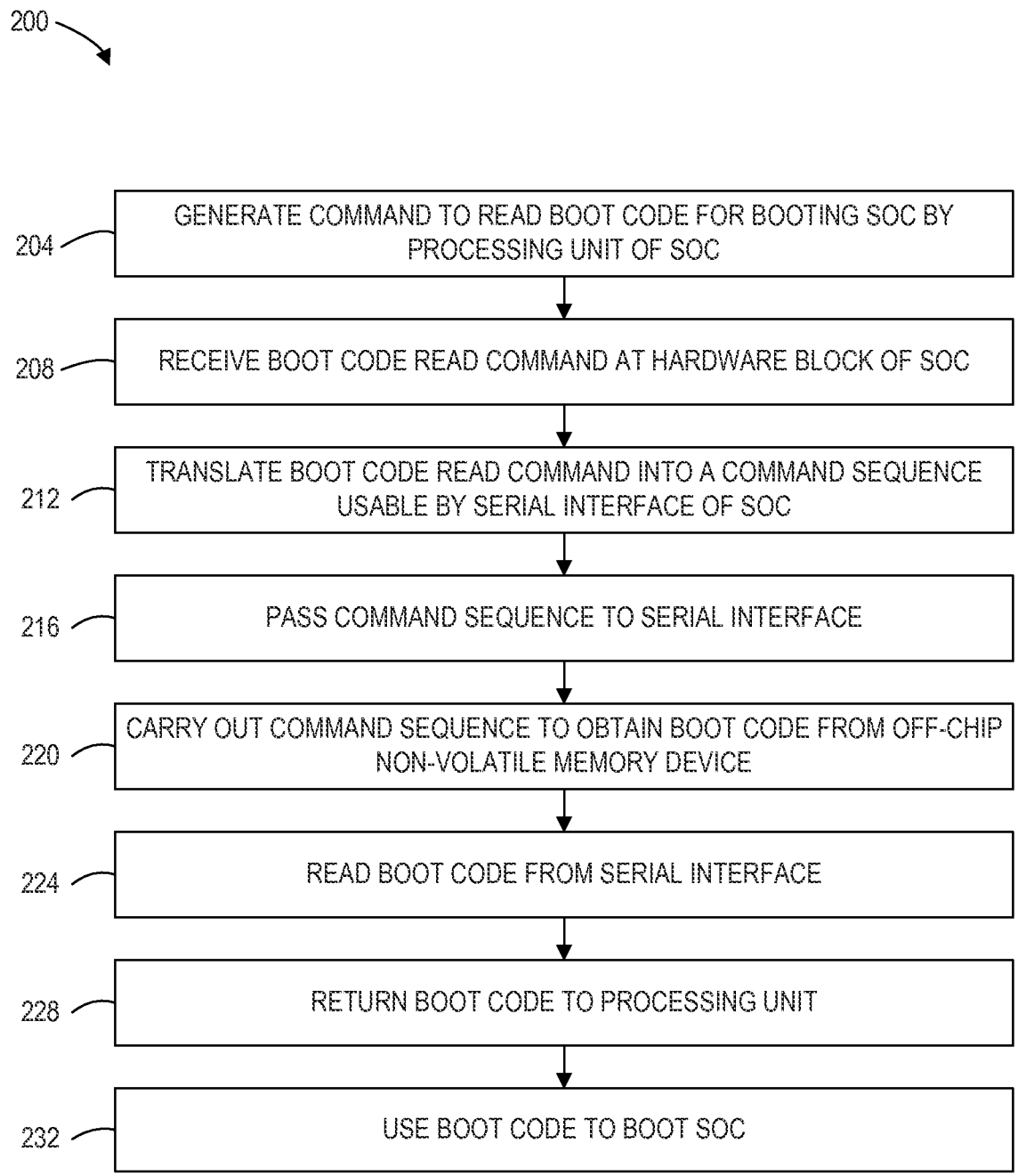
FIG. 2 is a flow diagram of a method of reading boot code from an off-chip non-volatile memory device via a serial interface of an SoC for use in booting the SoC according to one embodiment.

In this regard, the SoC 100 of FIG. 1 includes a hardware block 140 (e.g., a "boot block translation unit") that functions as a bus slave device to receive boot code read request commands from the processing unit 104 and then facilitate retrieval of boot code 148 (e.g., computer-readable instructions) from an off-chip non-volatile memory device 144 (e.g., flash memory, SD memory, etc.) via a low pin count serial interface 132 (Serial Peripheral Interface (SPI) interface, Inter-Integrated Circuit ($I^2C$) interface, and/or the like) of the SoC 100. As used herein, a "low pin-count" may be not more than about 10 signal pins, such as not more than about 8 signal pins, or not more than about 5 signal pins. To facilitate the reader's understanding of how the hardware block 140 facilitates the retrieval of boot code 148 from the off-chip non-volatile memory device 144 for use by the processing unit 104 in booting the SoC 100 (e.g., after a reset or powering-on of the SoC 100), reference will now additionally be made to FIG. 2 which presents a method 200 of reading boot code 148 from the off-chip non-volatile memory device 144 via the serial interface 132 for use in booting the SoC 100 according to one embodiment. While one particular arrangement of steps of the method 200 will be discussed, it is to be understood that various other arrangements of steps may be included in the method 200 such as fewer steps, additional steps, and/or different steps when doing so is consistent with the teachings presented herein.

At 204, the processing unit 104 may appropriately generate one or more commands to read boot code 148 (boot code "read commands" or "read request commands") from one or more particular addresses of the off-chip non-volatile memory device 144 (e.g., upon a reset or powering-on of the SoC 100). For instance, the processing unit 104 may generate read commands by instruction fetches of the boot code 148 or loads to the boot code 148. In one embodiment, the instruction fetch may be the first instruction fetch out of reset for the processing unit 104. As another example, the commands may be generated according to a protocol of the first bus 108 and may be appropriately sent out over the first bus 108. The method 200 may then include receiving 208 (e.g., intercepting) the read request commands at an interface 152 of the hardware block 140 (e.g., via the bridge 120 and the second bus 112) and translating 212 (e.g., by translator 156 of hardware block 140) the read request commands into a command sequence understandable or otherwise usable by the serial interface 132 to read and obtain the boot code 148 from the off-chip non-volatile memory device 144.

Generally, a serial interface such as serial interface 132 (e.g., an SPI) often requires that a particular command sequence be programmed into it to allow the serial interface 132 to read information (e.g., instructions, code, etc.) of interfaced devices such as off-chip non-volatile memory device 144. When the SoC 100 is already booted up, an on-chip processor such as processing unit 104 would typically program the serial interface 132 to be able to appropriately read the off-chip non-volatile memory device 144. In the event that the SoC 100 is not yet booted up, however, there is not a processor that can appropriately program the serial interface 132 to read the off-chip non-volatile memory device 144.

Accordingly, the translator 156 of the hardware block 140 receives the read request commands generated by the processing unit 104 and translates the read request commands into a series or sequence of commands understandable by the serial interface 132 for use in obtaining the boot code 148 from the off-chip non-volatile memory device 144. In one arrangement, the command sequence may be a particular series of write and read operations to be carried out by the serial interface 132 relative to the off-chip non-volatile memory device 144 to obtain individual portions (e.g., words) of the boot code 148. For instance, one read/write process may extract, from the incoming bus request, the address and length of the boot code request, use reads/writes to the serial interface 132 to configure the address and length (e.g., as well as a START/GO command), iterate/poll the serial interface 132 waiting for the data to arrive from the boot device, and then extract it. In some variations, the translator 156 may essentially "talk" to the serial interface 132 in the same or similar manner in which software would do so after boot (e.g., such as in the case of software accessing mass storage via the serial interface 132 after boot).

In any case, the method 200 may include the hardware block 140 passing 216 the command sequence (via interface 160 over third bus 116) to the serial interface 132. Upon receipt, the serial interface 132 may carry out 220 the particular command sequence to read and obtain the boot code 148 from the off-chip non-volatile memory device 144. For instance, the command sequence may involve carrying out multiple write and/or read commands to read one or more words/portions of the boot code 148 from the off-chip non-volatile memory device 144. In some variations, a handshaking process may be performed between the serial interface 132 and the off-chip non-volatile memory device 144 (e.g., an automated process of negotiation dynamically setting parameters of a communications channel established between the serial interface 132 and the off-chip non-volatile memory device 144) before the serial interface 132 can obtain boot code portions from the off-chip non-volatile memory device 144. In any event, the various portions of the boot code 148 may be serially read 224 from the serial interface 132 by the hardware block 140 (e.g., via the third bus 116). In one arrangement, the hardware block 140 may serially collect and arrange received portions to create individual instructions of the boot code 148. In the event that additional information (e.g., data, code) is received at the hardware block 140 from the serial interface 132 along with the boot code 148 or portions of the boot code 148, the hardware block 140 may appropriately filter out such other information.

At 228, the boot code 148 (e.g., at least one instruction of the boot code 148) may be returned to the processing unit 104 (e.g., via first and second busses 108, 112 and bridge 120). Upon receipt of the boot code 148 at the processing unit 104, the processing unit 104 may proceed to appropriately execute the instructions of the boot code 148 to boot the SoC 100. Advantageously, the processing unit 104 may boot the SoC 100 completely from the instructions of the boot code 148 stored in the off-chip non-volatile memory device 144. For instance, the first read of boot code instructions from the off-chip non-volatile memory device 144 may be part of the first instruction fetch of the processing unit 104. In one arrangement, the processing unit 104 may be configured to generate 204 a read request command (e.g., an instruction fetch) for each respective instruction of the boot code 148, whereby a subsequent read request command may not be generated 204 until after the previous boot code instruction has been obtained from the off-chip non-volatile memory device 144, returned 228 to the processing unit 104 and executed by the processing unit (e.g., to avoid or at least limit the need for RAM buffering of fetched boot code instructions).

The disclosed utilities advantageously allow for post tape-out changes to the boot code to be made free of necessitating subsequent tape-outs of the SoC 100 (e.g., as the boot code is stored on the off-chip non-volatile memory device 144 as opposed to on on-chip ROM or the like), a reduction in the number of total signal pins needed to electrically interconnect the off-chip non-volatile memory device 144 to the SoC 100, and the like. It will be readily appreciated that many deviations may be made from the specific embodiments disclosed in the specification without departing from the spirit and scope of the invention. For instance, while the SoC 100 has been illustrated with first, second and third buses 108, 112, 116, the SoC 100 may in other arrangements include more or fewer than three buses. As another example, while the utilities disclosed herein have been discussed in the context of boot code 148, it is to be understood that other types of information (e.g., data, instructions, etc.) may be appropriately stored in the off-chip non-volatile memory device for retrieval and use in manners consistent with the teachings presented herein. As a further example, it is envisioned that at least a copy of the boot code 148 may be stored in an off-board ROM to allow for changes to the boot code 148 free of re-spinning (e.g., making a new version of) the silicon of the SOC 100. It is to be understood that the functionalities performed by many of the processes and modules discussed herein may be performed by other modules, devices, processes, etc.

The illustrations and discussion herein has only been provided to assist the reader in understanding the various aspects of the present disclosure. Embodiments disclosed herein can be implemented as one or more computer program products, i.e., one or more modules of computer program instructions encoded on a computer-readable medium for execution by, or to control the operation of, data processing apparatus. For example, the various components of hardware block 140 (e.g., the translator 156) may be provided in such computer-readable medium and executed by a processor or the like. The computer-readable medium can be a machine-readable storage device, a machine-readable storage substrate, a memory device, a composition of matter affecting a machine-readable propagated signal, or a combination of one or more of them.

It is to be understood that the functionalities performed by many of the processes and modules discussed herein may be performed by other modules, devices, processes, etc. The illustrations and discussion herein has only been provided to assist the reader in understanding the various aspects of the present disclosure. Embodiments disclosed herein can be implemented as one or more computer program products, i.e., one or more modules of computer program instructions encoded on a computer-readable medium for execution by, or to control the operation of, data processing apparatus. For example, the various components of hardware block 140 (e.g., the translator 156) may be provided in such computer-readable medium and executed by a processor or the like. The computer-readable medium can be a machine-readable storage device, a machine-readable storage substrate, a memory device, a composition of matter affecting a machine-readable propagated signal, or a combination of one or more of them.

A computer program (also known as a program, software, software application, script, logic, or code) used to provide the functionality described herein can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatuses can also be implemented as, special purpose logic circuitry, e.g., an FPGA (field programmable gate array) or an ASIC (application-specific integrated circuit). Processors suitable for the execution of a computer program may include, by way of example, both general and special purpose microprocessors, and any one or more processors of any kind of digital computer. Generally, the elements of a computer are one or more processors for receiving and performing (e.g., executing) instructions and one or more memory devices for storing instructions and data. The techniques described herein may be implemented by a computer system configured to provide the functionality described.

Typically, a computing device such as the SoC 100 may include, or be operatively coupled to receive data from or transfer data to, or both, one or more mass storage devices for storing data, e.g., magnetic, magneto-optical disks, or optical disks. However, a computing device need not have such devices. The SoC 100 can be embedded in another device, e.g., a mobile telephone, a personal digital assistant (PDA), a mobile audio player, a Global Positioning System (GPS) receiver, a digital camera, to name just a few.

While this disclosure contains many specifics, these should not be construed as limitations on the scope of the disclosure or of what may be claimed, but rather as descriptions of features specific to particular embodiments of the disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

We claim:

1. A method for use with a system on a chip (SoC), comprising:
receiving, at a hardware block of the SoC over a first bus of the SoC, a first command to read a first instruction stored in an off-board memory device;
translating, at the hardware block, the first command from a bus protocol into a first command sequence usable by a low pin-count serial interface of the SoC to read the first instruction from the off-board memory device, wherein the low pin-count serial interface has 10 or fewer signal pins;
sending the first command sequence from an interface of the hardware block to the low pin-count serial interface over a second bus of the SoC, the second bus being electrically connected to the interface of the hardware block;
generating a second command to read a second instruction for use in booting the SoC;
translating, by the hardware block of the SoC, the second command into a second command sequence usable by the low pin-count serial interface of the SoC to read the second instruction from the off-chip non-volatile memory device or another off-chip non-volatile memory device, wherein the second instruction is different than the first instruction;
receiving, at a processing unit, the second instruction from the hardware block; and
executing, by the processing unit, the received second instruction,
wherein the processing unit is configured to perform the generating of the second command step only after previously requested boot code instructions are received from the off-chip non-volatile memory device or another off-chip non-volatile memory device and are executed by the processing unit, whereby buffering requirements of fetched boot code instructions is limited.

2. The method of claim 1, further comprising:
reading the first instruction from the serial interface with the hardware block.

3. The method of claim 2, further comprising before the reading step:
performing a handshake operation by the serial interface to obtain a plurality of portions of information from the off-board memory device at the serial interface.

4. The method of claim 3, wherein the performing step includes:
carrying out a plurality of write and read requests of the off-board memory device to obtain the plurality of portions of information.

5. The method of claim 2, wherein the first read command is received from a processing unit of the SoC, and wherein the method further comprises:
returning the first instruction to the processing unit.

6. The method of claim 1, wherein the first instruction comprises boot code, and wherein the receiving step occurs as part of a boot of the SoC.

7. The method of claim 1, wherein the off-board memory device comprises a flash memory device, and wherein the serial interface comprises a Serial Peripheral Interface (SPI).

8. A system on a chip (SoC), comprising:
a chip;
a processing unit on the chip;
a serial interface on the chip;
a hardware block on the chip;
a first bus electrically interconnected between the hardware block and the processing unit; and
a second bus electrically interconnected between the hardware block and the serial interface, wherein the second bus provides a first communication path between the hardware block and the serial interface, wherein the hardware block comprises a translation unit that translates a first command received from the processing unit, via the first bus, to retrieve a first instruction of boot block code from an off-chip non-volatile memory device into a corresponding first command sequence understood by the serial interface, wherein the hardware block sends the first command sequence to the serial interface via the second bus for retrieval of the first instruction of boot block code from the off-chip non-volatile memory device;
wherein the processor is configured to execute the first instruction of boot block code and subsequently send a second command to the hardware block for retrieval of a second instruction of boot block code from the off-chip non-volatile memory device, and
wherein the processing unit is configured to generate additional read request commands only after previously requested boot code instructions are received from the off-chip non-volatile memory device and executed by the processing unit, whereby buffering requirements of fetched boot code instructions is limited.

9. The SoC of claim 8, wherein the first command sequence comprises a plurality of write and read requests of the off-chip memory device to obtain the first instruction of boot block code.

10. The SoC of claim 8, wherein the serial interface comprises a signal pin count of not greater than five pins.

11. A method of booting a system on a chip (SoC), comprising:
generating a first command to read first boot code for use in first booting the SoC;
receiving the first boot code read command at a hardware block from a processing unit over a first bus of the SoC;
translating, by the hardware block of the SoC, the first read command into a first command sequence usable by a serial interface of the SoC to obtain the first boot code from an off-chip non-volatile memory device;
sending, from the hardware block, the first command sequence to the serial interface over a second bus different than the first bus;
carrying out, by the serial interface, the first command sequence to obtain the first boot code from the off-chip non-volatile memory device;
generating a second command to read second boot code for use in booting the SoC;
translating, by the hardware block of the SoC, the second command into a second command sequence usable by the serial interface of the SoC to obtain second boot code from the off-chip non-volatile memory device or another off-chip non-volatile memory device, wherein the second boot code is different than the first boot code;
receiving, at the processing unit, the second boot code from the hardware block; and
booting, by the processing unit, the SoC using the second boot code, wherein the processing unit is configured to perform the generating step only after previously requested boot code instructions are received from the off-chip non-volatile memory or another off-chip non-volatile memory device and are executed by the processing unit, whereby buffering requirements of fetched boot code instructions is limited.

12. The method of claim 11, wherein the booting steps occur free of using boot code read from an on-chip memory device.

13. The method of claim 11, wherein the serial interface comprises a Serial Peripheral Interface (SPI).

14. The system of claim 8, wherein the second bus is used to both send the first command sequence to the off-chip non-volatile memory device and to receive the first instruction of boot block code from the off-chip non-volatile memory device.

* * * * *